L. A. YOUNG.
SPRING STRUCTURE.
APPLICATION FILED NOV. 4, 1913.

1,155,392.

Patented Oct. 5, 1915.
3 SHEETS—SHEET 1.

L. A. YOUNG.
SPRING STRUCTURE.
APPLICATION FILED NOV. 4, 1913.
1,155,392.
Patented Oct. 5, 1915.
3 SHEETS—SHEET 2.
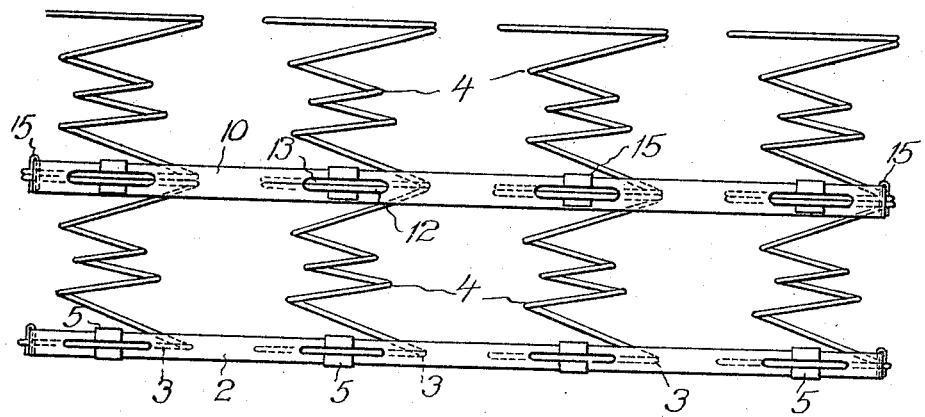
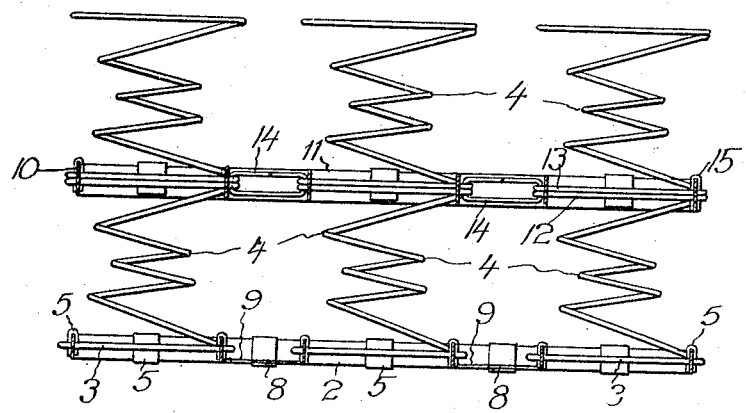
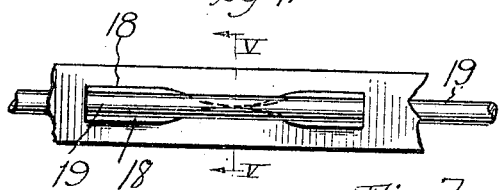
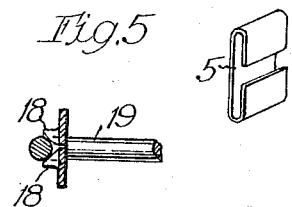
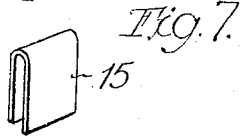
Witnesses
Inventor
Leonard A. Young.
By
Attorneys L. A. YOUNG.
SPRING STRUCTURE.
APPLICATION FILED NOV. 4, 1913.
1,155,392.
Patented Oct. 5, 1915.
3 SHEETS—SHEET 3.
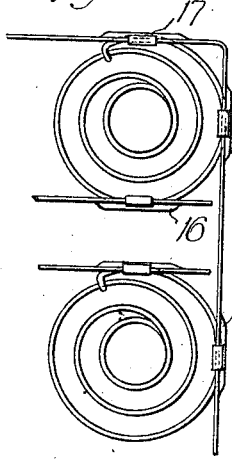
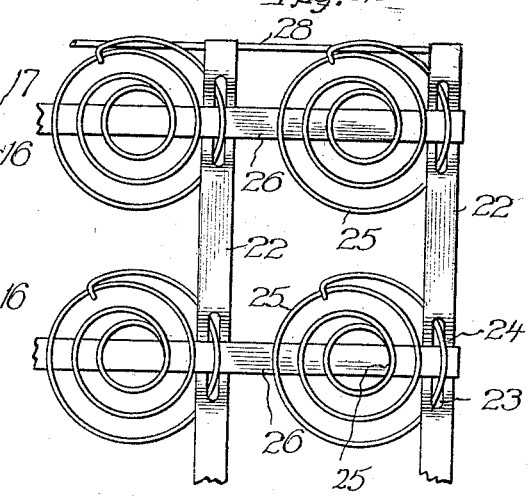
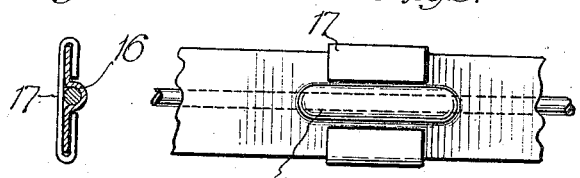
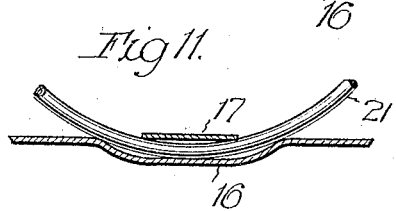
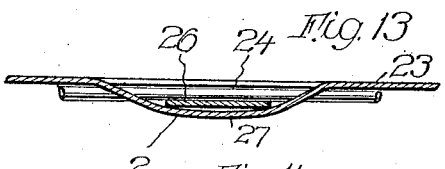
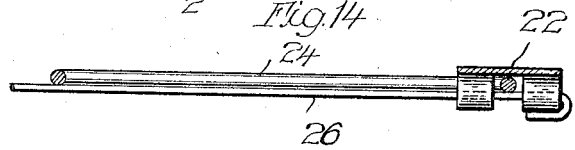
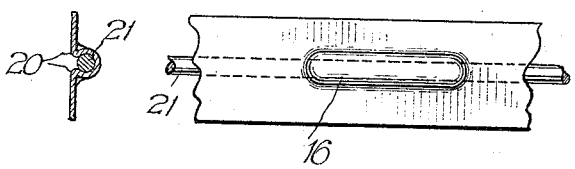
Inventor
Leonard A. Young.
Witnesses
E. R. Barrett
A. M. Dorr
Attorneys

UNITED STATES PATENT OFFICE.

LEONARD A. YOUNG, OF DETROIT, MICHIGAN.

SPRING STRUCTURE.

1,155,392.  Specification of Letters Patent.  Patented Oct. 5, 1915.

Application filed November 4, 1913. Serial No. 799,101.

*To all whom it may concern:*

Be it known that I, LEONARD A. YOUNG, a citizen of the United States of America, residing at Detroit, in the county of Wayne and State of Michigan, have invented certain new and useful Improvements in Spring Structures, of which the following is a specification, reference being had therein to the accompanying drawings.

This invention relates to a spring structure suitable for seats of automobiles and other vehicles and to an arrangement thereof whereby the number of parts are minimized without detriment to the cushioning effect of the structure, the parts also being so arranged that they can be readily assembled without the use of power tools.

The invention consists in the matters hereinafter set forth and more particularly pointed out in the appended claims.

Figure 1:
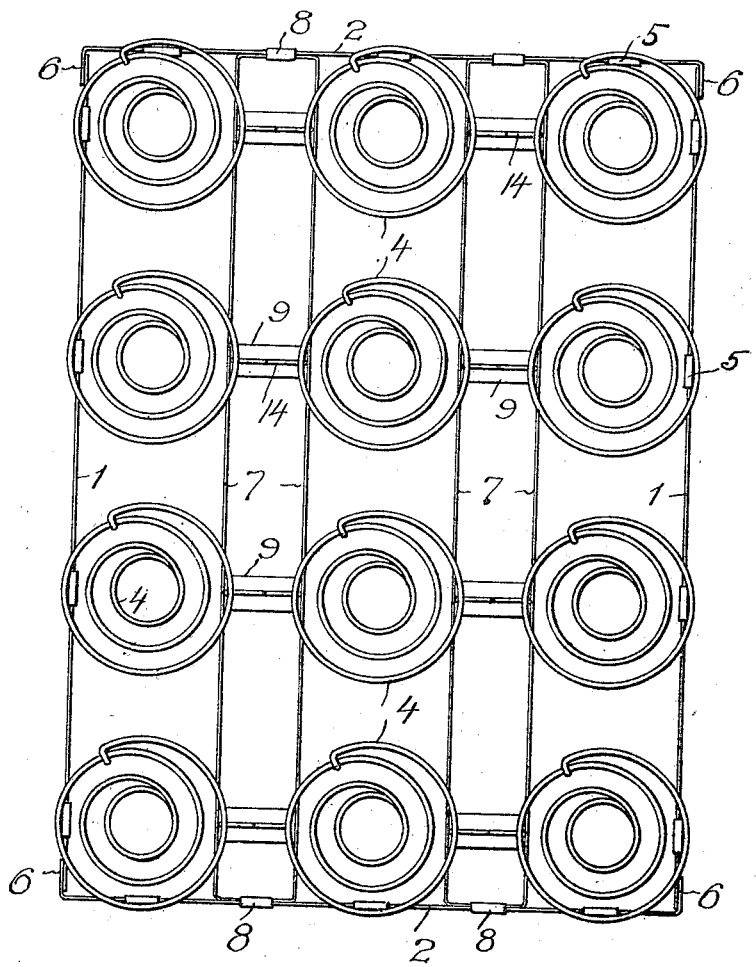
Figure 17:
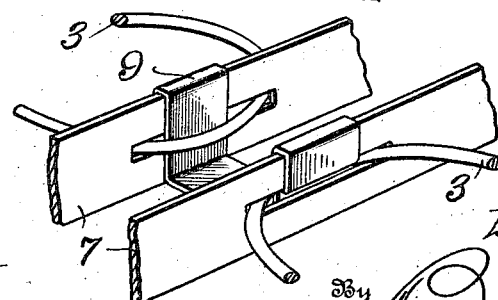

In the drawings, Figure 1 is a plan view of a structure that embodies features of the invention; Fig. 2 is a view in front elevation thereof; Fig. 3 is a view in transverse vertical section of the structure; Fig. 4 is a view in detail of a modification of a spring and frame member; Fig. 5 is a view in section on line V—V of Fig. 4; Fig. 6 is a view in detail of a clip; Fig. 7 is a view in detail of a modification thereof; Fig. 8 is a fragmentary view of a modification of a structure; Figs. 9, 10 and 11 are views in detail of the connections of the modified structure; Fig. 12 is a plan view, partially broken away, of another modification of the structure; Figs. 13 and 14 are views in detail of the connections of a further modification; Fig. 15 illustrates details of another convenient method of securing the spring to the frame; and Fig. 16 is a view in detail of another modification of a spring fastening means. Fig. 17 is a view in perspective showing method of attaching clips.

Referring to the drawings a base frame is formed of side strips 1 and end strips 2 that are turned on edge and are slotted longitudinally at intervals to receive the base coils 3 of upright body springs 4. Clips 5 that embrace the members 1 and 2 prevent the withdrawal of the springs. The corner springs tie the adjacent end portions of the strips together, finish being obtained by bending the end portions 6 of the end strips around the side member. The intermediate strips 7 that are similarly slotted and may be attached to the end members 2 by suitable clips 8 are locked in spaced relation by the base turns of the body springs that are seated in the slots and coöperating clips 9 that are folded around the strips behind the protruding portions of the springs.

An intermediate frame is formed of side members 10 and end members 11 similar to those of the base strip which are slotted to receive the adjacent turns of the body spring. If the body springs are of one piece this intermediate frame is connected to the intermediate turns of the spring. If the body springs are in sets of two which are superposed, the intermediate frame is arranged to receive the upper turns 12 of the lower set of springs and the superposed base turns 13 of the upper set, suitable wire loop clips 14 acting to lock the springs in the strips. U-shaped clips 15 or other like holding means dropped over the edges of the members 10 may be employed to retain the springs therein. Or clips similar to the folding parts of the base frame may be used.

The members of the frame may have longitudinal lugs or bosses 16 formed thereon (Figs. 8, 9, 10 and 11) with the turns of the springs inserted therein and held by clips 17 similar to the clips 5 but reversed in position. Or the clips may be entirely eliminated by slotting the strips as in Figs. 4 and 5 by pressing out parallel tongues 18 on either side of the opening, inserting the base turn 19 of a spring and then pressing the middle portions of the tongues 18 back to normal position behind the spring 19. Or as indicated in Fig. 15 recesses may be formed as described in the modification shown in Fig. 8 and the springs retained therein by pinching down the middle portions of the sides forming each boss whereby retaining shoulders 20 lock the spring turn 21 in position. This interlocking of the spring and flat strip with the strip on edge is preferable where considerable rigidity is required in the base frame. Where the base frame rests on a flat supporting surface or is otherwise stiffened it may be constructed as indicated in Figs. 12, 13 and 14. Longitudinal members 22 have longitudinal slots 23 in depressed or off-set portions of the strips. Base turns 24 of body springs 25 are inserted in these slots and are locked therein by transverse strips 26 that support the other sides of the turns and pass between the inserted portions and depressed parts 27 of the longitudinal strips 23. At the ends, the strips 26 may be bent around the members 22 and thereby form a suitable holding means to prevent spreading of the base frame. A rim member 28 may be used to finish the end portions of the base.

As a result of this construction in any one of its forms, a structure is obtained in which the members of the frames are held in interlocked and operative relation by the base turns of the springs which they support, the holding means being such that the structure does not have to be passed through power presses or machines of like character while being assembled. Extreme lightness and rigidity are combined in the structure and it is particularly effective in use in automobile seats and like places where it is subjected to hard usage.

Obviously, changes in the details of construction may be made without departing from the spirit of my invention and I do not care to limit myself to any particular form or arrangement of parts.

What I claim is:—

1. A spring structure comprising a base frame having longitudinal and transverse members each provided with longitudinal recesses, upright body springs the base coils of which engage in the recesses, and means for locking the base turns therein, the springs and locking means spacing and holding the frame members in operative relation.

2. A spring structure comprising a base frame having longitudinally recessed side, end and intermediate members, upright body springs the base turns of which engage in the recesses of the frame members and are interlocked therein, the springs operating as spacing and holding members for retaining the frame members in operative relation.

3. A spring structure comprising a base frame having side, end and intermediate members with recesses therein, upright body springs the base turns of which are locked in the recesses of the frame member and act as spacing and holding means for retaining the frame members in operative relation.

4. A spring structure comprising a frame formed of side, end and intermediate strips on edge provided with spring seating recesses and upright body springs the base turns of which are seated in the recesses and locked with the strips, the base turns and strips coöperating to lock the frame together.

5. In a spring structure, a base consisting of side, end and intermediate strips on edge provided with longitudinal recesses, upright body springs, the base turns of which are seated in the recesses, clips securing the inserted turns of the side and end members, and clips securing adjacent portions of pairs of turns in the intermediate members and holding the latter in spaced relation.

6. A spring structure comprising a base of flat side, end and intermediate strips on edge having longitudinal recesses therein, body springs the base turns of which are seated in the recesses, means securing the base turns therein and holding the intermediate members in spaced relation, an intermediate frame having side, end and intermediate strips on edge with longitudinal recesses engaged by upper turns of the body springs, and means interlocking the upper turns with the strip and holding the parts in spaced relation.

7. A spring structure comprising a base having side, end and intermediate strips on edge provided with longitudinal recesses, a lower set of body springs the base turns of which are seated in the recesses, clips locking the side and end members to the inserted portions of the base turns, clips securing the intermediate members to the inserted portions of the base turns and holding them in spaced relation, an upper set of body springs, an intermediate frame of side, end and intermediate strips with longitudinal recesses in which the superposed upper and lower turns of both sets of springs are introduced, clips locking the inserted portions of the superposed turns with the side and end members and clips locking the inserted portions of the superposed turns in the intermediate strips and holding the latter in spaced relation.

In testimony whereof I affix my signature in presence of two witnesses.

LEONARD A. YOUNG.

Witnesses:
C. R. STICKNEY,
OTTO H. PARKER.